Patented Mar. 12, 1940

2,193,651

UNITED STATES PATENT OFFICE

2,193,651

ACCELERATOR OF VULCANIZATION

Waldo L. Semon, Silver Lake, Ohio, assignor to The B. F. Goodrich Company, New York, N. Y., a corporation of New York No Drawing. Application September 15, 1937, Serial No. 163,986

15 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability resulted in a search for less active materials. Derivatives of mono-aryl and alkyl-aryl dithiocarbamic acids have been proposed as accelerators, but they are subject to the same disadvantages and, in some cases, are even more active than the dialkyl compounds.

The process of this invention consists in vulcanizing rubber in the presence of a polynitroaryl ester of a diaryl dithiocarbamic acid. For example 2,4 dinitrophenyl, 2,6 dinitro 4 chlorophenyl, picryl, 2,6 dinitro 1 naphthyl, 2,6 dinitro 4 methylphenyl, and similar polynitroaryl esters of diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl-p-isopropenylphenyl, p-allylphenyl-beta-naphthyl, phenyl-p-isopropoxyphenyl, phenyl-p-phenyloxyphenyl, phenyl-p-hydroxyphenyl, di-o-anisyl, phenyl-p-chlorophenyl, phenyl-m-bromphenyl, phenyl-p-dimethylaminophenyl, phenyl-p-methylaminophenyl, phenyl-p-anilinophenyl, phenyl-p-nitrophenyl, phenyl-p-acetylamidophenyl, or other like diaryl dithiocarbamic acids are all excellent accelerators of vulcanization. The term aryl is therefore to be understood as designating both unsubstituted and substituted monovalent radicals containing an aromatic carbocyclic ring with the free valence on a nuclear carbon atom unless it is specifically limited to hydrocarbon aryl groups. The diaryl arylene bis dithiocarbamic acids such as diphenylphenylene bis dithiocarbamic acid are also included in the generic term diaryl dithiocarbamic acid. The properties of these diaryl-dithiocarbamic esters differ markedly from those of the corresponding aliphatic esters, especially in respect to the speed with which they effect vulcanization. While the aliphatic dithiocarbamic esters produce rapid, uncontrollable vulcanization, the accelerators of this invention, as will be hereafter shown, produce the slow, even acceleration which is so necessary to produce uniform well-vulcanized industrial products.

The accelerators of this invention are easily prepared by a number of methods. A convenient method consists in reacting a halogenated polynitroaryl compound with a metallic salt of a diaryl dithiocarbamic acid. 2,4 dinitrophenyl diphenyl dithiocarbamate, for instance, may be made by reacting 2,4 dinitro 1 chlorobenzene with sodium diphenyl-dithiocarbamate.

As a specific example of one embodiment of the method of this invention, a rubber composition was prepared by mixing rubber 100 parts by weight, zinc oxide 5 parts, stearic acid 1 part, sulfur 3.5 parts, and 2,4 dinitrophenyl diphenyl dithiocarbamate 0.5 part. This composition did not cure at all when it was heated in a press for 30 minutes at 240° F., and it required 120 minutes to reach a full cure at this temperature. Full cures (between 3500 and 4000 lbs. per sq. in. tensile strength) were reached in 90 minutes at 260° F., 45 minutes at 275° F., and 30 minutes at 287° F.

Similar excellent results, unobtainable with the similar aliphatic compounds, are obtained with 2,4 dinitrophenyl phenyl-beta-naphthyl-dithiocarbamate, 2,6 dinitro 4 chlorophenyl diphenyl dithiocarbamate, and indeed any of the accelerators herein described.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanized rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving or suspending therein; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a polynitroaryl N diaryl dithiocarbamate.

2. The process which comprises vulcanizing rubber in the presence of a polynitroaryl N di(hydrocarbon aryl) dithiocarbamate.

3. The process which comprises vulcanizing rubber in the presence of a dinitroaryl N diaryl dithiocarbamate.

4. The process which comprises vulcanizing rubber in the presence of a 2,4 dinitrophenyl N diaryl dithiocarbamate.

5. The process which comprises vulcanizing rubber in the presence of a 2,4 dinitrophenyl N phenylaryl dithiocarbamate.

6. The process which comprises vulcanizing rubber in the presence of 2,4 dinitrophenyl diphenyl dithiocarbamate.

7. The process which comprises vulcanizing rubber in the presence of 2,4 dinitrophenyl phenyl-beta-naphthyl dithiocarbamate.

8. The process which comprises vulcanizing rubber in the presence of 2,6 dinitro 4 chlorophenyl diphenyl dithiocarbamate.

9. The process which comprises heating a mixture of rubber, sulfur, and a polynitroaryl N diaryl dithiocarbamate.

10. An unvulcanized rubber composition containing rubber, a vulcanizing agent, and a polynitroaryl N-diaryl dithiocarbamate.

11. An unvulcanized rubber composition containing rubber, a vulcanizing agent, and a polynitroaryl N-di(hydrocarbon-aryl) dithiocarbamate.

12. An unvulcanized rubber composition containing rubber, a vulcanizing agent, and a dinitroaryl N-diaryl dithiocarbamate.

13. An unvulcanized rubber composition containing rubber, a vulcanizing agent, and 2,4 dinitrophenyl diphenyl dithiocarbamate.

14. An unvulcanized rubber composition containing rubber, a vulcanizing agent, and 2,4 dinitrophenyl phenyl-beta-naphthyl dithiocarbamate.

15. An unvulcanized rubber composition containing rubber, a vulcanizing agent, and 2,6 dinitro 4 chlorophenyl diphenyl dithiocarbamate.

WALDO L. SEMON.